UNITED STATES PATENT OFFICE.

ROBERT PATTERSON, OF PHILADELPHIA, PENNSYLVANIA, ASSIGNOR TO HORACE VAUGHN, OF PROVIDENCE, RHODE ISLAND.

SOLUTION FOR THINNING A LUBRICATING COMPOUND.

Specification forming part of Letters Patent No. 25,792, dated October 11, 1859.

*To all whom it may concern:*

Be it known that I, ROBERT PATTERSON, of the city and county of Philadelphia, in the State of Pennsylvania, have invented a new and Improved Method of Thinning Fluids (containing oil and lime-water as a base) for Lubricating Purposes; and I do hereby declare that the following is a full and exact description thereof.

The object of my invention is to provide a thinning solution to be used for the purpose of reducing the consistency of the lubricating compound described in the patent of Vaughn and Hutton, dated 2d August, 1859, and of other similar compounds.

Lubricating compounds in which hot lime-water is used for dissolving and extracting the strength of other cooling materials are found to act admirably on heavy machinery, but are too thick for advantageous application to very fine machinery, and it therefore becomes necessary to reduce them by some means which will not impair their desirable qualities. For this purpose we may employ solutions of sal-soda, pearlash, and other like substances in proportions varying with the agent selected and the particular character of the oil employed in the lubricating compound upon which it is proposed to operate. It has been found in practice that sal-soda is generally the best of the substances named, and I shall therefore describe the process of using it.

Take of the lubricating compound to be reduced, say, thirty gallons. Add to it eight ounces of sal-soda dissolved in three pints of water, and stir the mixture well, when the solution will be found to have lost its objectionable thickness.

The exact quantity of the soda solution required to be added will vary, as before stated, with the kind of oil of which the lubricating compound has been made. Sperm-oil, for example, being heavier than lard-oil, requires more of the solution to thin it. The proportion in each case is easily discovered by a moment's experiment.

Care must be taken not to add too much of the solution, as, in that case, it acts as a separator, setting the oil free from the other constituents of the lubricator.

What I claim is—

A thinning solution applicable to the reduction of the lubricating compound described in the patent of Vaughn and Hutton, dated 2d August, 1859, made of the substances and applied substantially in the manner specified.

ROBERT PATTERSON.

In presence of—
AARON S. LIPPINCOTT,
GEO. H. EARLE.